M. BUCH.
TOP FOR MOTOR VEHICLES AND THE LIKE.
APPLICATION FILED APR. 7, 1919.
Reissued Dec. 5, 1922. 15,499.
2 SHEETS—SHEET 1.
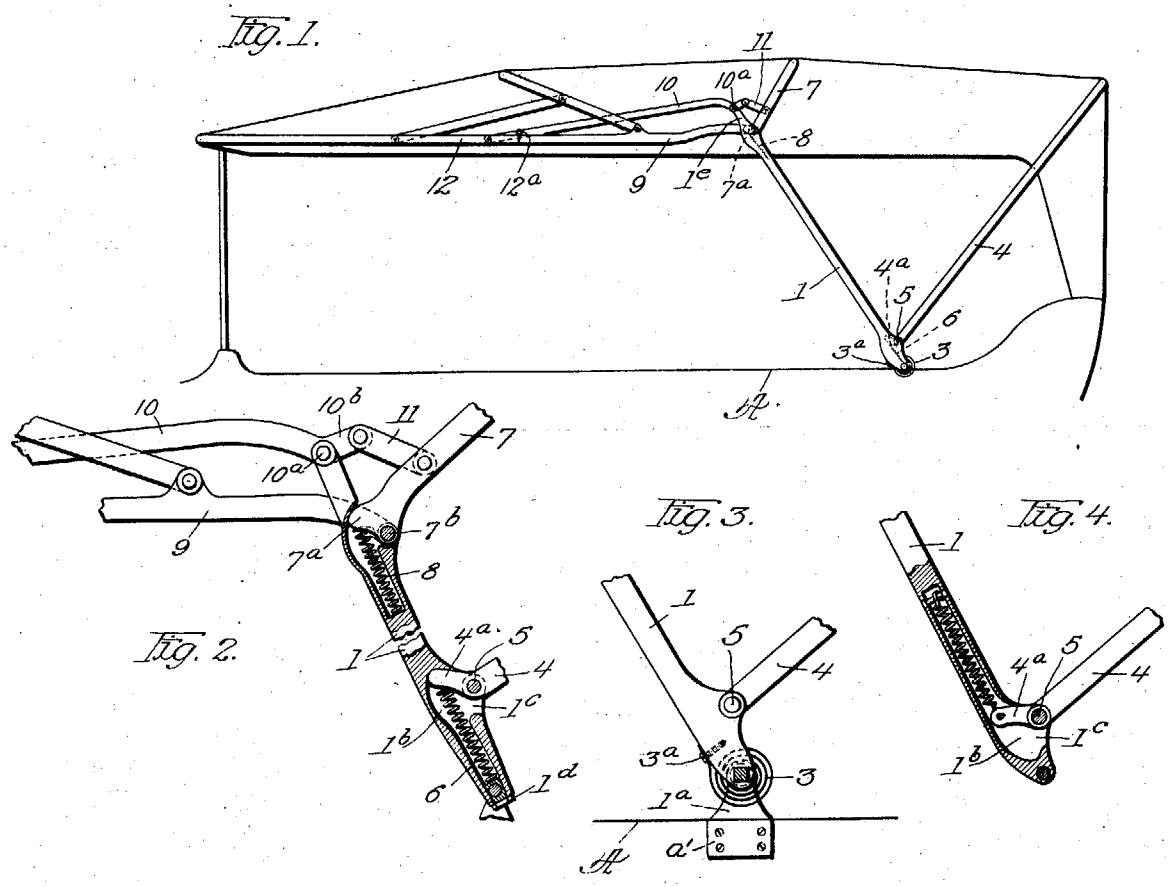
Inventor
Max Buch.
Emery, Booth, Janney & Varney Attys.

M. BUCH.

TOP FOR MOTOR VEHICLES AND THE LIKE.

APPLICATION FILED APR. 7, 1919.

Reissued Dec. 5, 1922.

15,499.

2 SHEETS—SHEET 2.

Inventor:
Max Buch
Emery, Booth, Janney & Varney Attys.

Reissued Dec. 5, 1922. Re. 15,499

UNITED STATES PATENT OFFICE.

MAX BUCH, OF DETROIT, MICHIGAN, ASSIGNOR, BY MESNE ASSIGNMENTS, TO EDWARDS CORPORATION, OF JACKSON, MICHIGAN.

TOP FOR MOTOR VEHICLES AND THE LIKE.

Original No. 1,221,669, dated April 3, 1917, Serial No. 108,646, filed July 11, 1916. Application for reissue filed April 7, 1919. Serial No. 288,404.

*To all whom it may concern:*

Be it known that I, MAX BUCH, a subject of the Emperor of Germany, residing at Detroit, Michigan, have invented certain new and useful Improvements in Tops for Motor Vehicles and the like, of which the following is a specification.

My present invention relates to improvements in tops for vehicles and more especially to those of the character usually designated "one man tops" and designed to be manipulated, in folding or extending, by a single operator.

The invention aims to provide a balanced top frame which will be capable of being raised or lowered with a minimum amount of energy; and it further aims to accomplish this object without detracting from the ornamental or finished appearance and with a minimum amount of exposed springs or counterbalancing devices.

With these and other objects in view the invention includes the novel features of construction and arrangement and combination of parts hereinafter described and particularly defined by the appended claims.

Several embodiments of my invention are illustrated in the accompanying drawings in which:

Figure 1 is a side elevation of a complete top as applied to a vehicle body and in extended position.

Figs. 2 and 3 are enlarged detail views.

Fig. 4 is a detail view of a modification.

Figure 5:
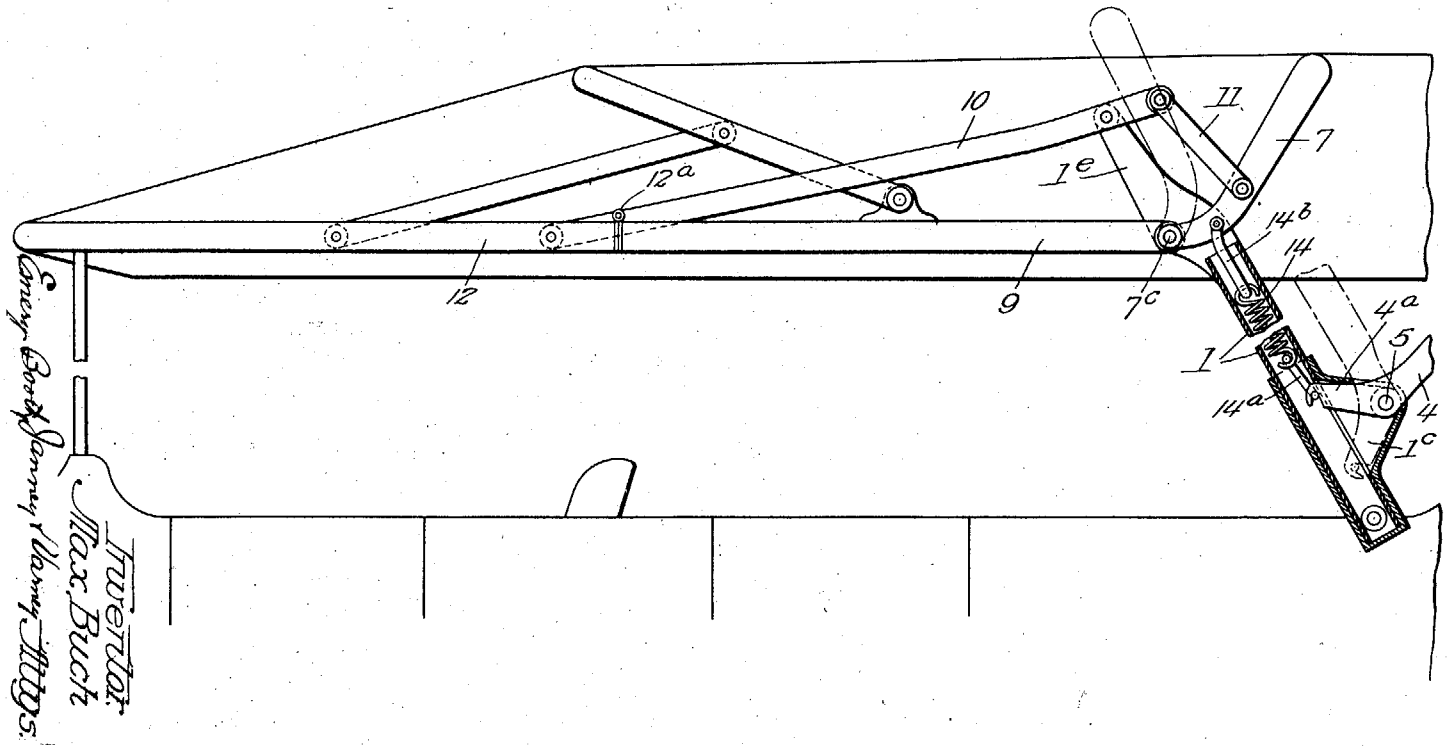
Fig. 5 is a view of a further modification.

In describing the form of top frame which I have chosen to illustrate my invention I would have it understood that this is by way of example only, my present invention not being limited to any specific arrangement of frame members, links, or levers except as they may be specifically included in any of the claims.

In the drawing the top being shown in side elevation only, the bow standards or arms and braces on one side appear but it will be understood that they are duplicated on the opposite side and when I speak of the parts in the singular it will be understood that the language is applicable to the other side also.

In this drawing, the numeral 1 designates what is usually termed the main bow standard which is shown as pivotally connected to the vehicle body A at $1^a$ by a body iron.

The body iron preferably has a square parts $a'$ to which is connected one end of a spiral spring 3, the other end of which is secured to the main bow supporting arm or standard by suitable means, such as screw $3^a$. When the top is extended or unfolded the main standard extends forward in an inclined position as shown, and the spring may be so adjusted that it tends to throw said bar rearwardly, thus assisting the operator in folding the top, said adjustment of the spring however, is so arranged that as the standard swings farther toward the rear tension is applied to the spring in a reverse direction, so that when said standard is in its completely folded, or substantially horizontal position, said spring tends to raise the standard to a vertical position, thus assisting the operator in the raising of the top by counterbalacing the weight of the standard and parts carried thereby.

It will be understood that ordinarily these motor vehicle tops are secured at the front to the upper corners of the wind shield so that such fastening resists any tendency of the spring to throw the standard to a vertical position. Where such front fastening is not used, however, the spring could be arranged so as to tend constantly to throw the standard forwardly, in which event its assistance would only be given the operator in raising the top from its folded position, which, indeed is where it is most needed.

The main rear bow arm is indicated at 4 and is shown as pivoted to the main standard by bolt 5. The lower portion of the standard is made hollow or tubular as indicated at $1^b$ and is provided at the upper end of this tubular bore with projections or widened out portions $1^c$ between which the rear bow arm 4 is pivoted. This rear bow arm has an angular extension $4^a$ extending into the hollow space of the standard, the underside of which is pressed against by a compression helical coiled spring 6 located within the hollow portion of the standard 1 and which tends to keep the rear bow arm 4 opened out, the folding of the rear bow arm against the standard serving to further compress the spring and thus cause said rear bow arm to automatically swing away from the standard in the unfolding of the top. This spring also tends to assist in the raising of the standard from its rearward folded position, as, the rear bow arm 4 being then supported by the ordinary supporting bracket, the spring reacting, through the pivot, on the standard, tends to exert a lifting action thereon.

The spring 6 is preferably inserted through the open lower end of the standard which is closed by a screw plug $1^d$ through which the pivot bolt or lug extends.

In light tops the spiral spring 3 might be omitted and the helical spring 6 relied on for the counter-balancing action to aid in lifting the bow standard 1 from its rearward folded position, but I prefer to supplement its action by the spiral spring.

Near the upper end of the standard and preferably between side plates or lugs formed by widening out said standard, is pivoted the lower end of a supplemental rear bow arm 7. This portion of the standard is also formed tubular or hollow and receives a compression spring 8, which bears at its lower end against the end of the socket, and at its upper end against an angular projecting portion $7^a$ of bow arm 7. The opening leading to the spring containing socket, is of such size and shape that when the arm is removed the spring can be readily inserted or withdrawn. In the embodiment shown in the drawings an extension link 9 for the outrigger bow is pivoted at its rear end to the hinge pin $7^b$ of bow arm 7 and the extension link 10 of the outrigger bow is pivoted at $10^a$ to a portion $1^e$ of standard 1 projected above the pivot $7^b$. Extension link 10 has an angular extension $10^b$ in rear of pivot $10^a$, which in effect constitutes a bell crank lever, which extension is connected by link 11 with bow arm 7. Spring 8 therefore, acting on part $7^a$ tends to swing bow arm 7 backward. This, when the parts are folded fully back, tends also to have a lifting effect on bow standard 1 until bow 7 is fully open and clear of the rear bow. Further, in its movement to the right in relation to standard 1 bow arm 7 through the pull of link 11 and bell crank $10$—$10^b$ tends to exert a lifting effect on the outrigger bow arm 12 in proximity to the lock hinge $12^a$.

Instead of using compression springs I may, by a slight modification, substitute tension springs as shown in Fig. 4.

A further embodiment of my invention is illustrated in Fig. 5.

In this I make the main standard 1 hollow throughout its length and arrange therein a single spring arranged to act both on the rear bow and the upper set of links or levers.

In this form the spring, indicated at 14, is shown as a tension spring connected at its lower end to the arm or extension $4^a$ of the rear bow arm 4 by a link $14^a$ which engages a slot in the extension $4^a$.

In this form I carry the bow arm 7 across and pivot it to the front side of the standard 1, as indicated at $7^c$, and connect the spring 14 to the arm 7 in rear of said pivot by link $14^b$, the arrangement, in other respects, being substantially the same. By this construction I get a single spring in each standard, acting both on the rear bow and the upper sets of links or levers.

Having thus described my invention what I claim is:

1. In a vehicle top, a standard pivotally connected with a vehicle body and having a hollow part, a bow supporting member pivoted to said standard and having an extension in line with said hollow part, and a spring within said hollow part acting between said standard and member.

2. A vehicle top having bow or standard members pivotally connected, spring means acting between said members and tending to separate them, an outrigger bow, a link connecting the same to one of said members, bell crank mechanism carried by one of said members, and operatively connected with the outrigger bow, and a link from said bell crank mechanism to the other member, whereby said spring also acts indirectly on the outrigger bow.

3. In a vehicle top, a main standard having a hollow portion, a bow arm pivoted to the rear of said standard, spring means within said hollow part tending to swing said bow arm relative to said standard, an outrigger bow arm, links connecting said outrigger bow arm with said standard, one of said links having an extension, and a link connecting said extension with said bow arm.

4. A vehicle top having a standard adapted to be pivotally supported from a vehicle body, rear main and supplemental bow arms pivoted respectively at or near the lower and upper ends of said standard, an outrigger bow, a pair of links supporting said outrigger bow from said standard and one of said links being operatively connected to said upper supplemental bow, and spring means within the standard acting on said rear main and supplemental bow arms.

5. A vehicle top having a standard adapted to be pivotally supported from a vehicle body, rear main and supplemental bow arms pivoted respectively at or near the lower and upper ends of said standard, an outrigger bow, bell crank mechanism supporting said outrigger bow from said standard and operatively connected to said upper supplemental bow, said standard being hollow throughout its length, and spring means located in said hollow standard and arranged to act on said main and supplemental bow arms.

6. In a vehicle top, a standard adapted for pivotal connection with a vehicle body, an outrigger bow arm, link mechanism pivotally connecting said outrigger bow arm with said standard, spring means carried by and disposed longitudinally of the standard, and means for causing said spring means to constantly tend to swing said link mechanism relative to the standard.

7. In a vehicle top, a standard adapted for pivotal connection with a vehicle body, a rear bow arm pivotally connected to said standard near its lower end, an outrigger bow arm, a link connecting said outrigger bow arm with the upper end of said standard, spring means within the standard, means for causing said spring means to act on said rear bow arm, and means for causing said spring means to act on said link.

8. In a vehicle top, a standard adapted to be pivotally connected with a vehicle body and having a hollow part, an outrigger bow arm, a link pivotally connecting said outrigger bow arm to said standard, a spring within said hollow part, and means whereby said spring is caused to act on said link to swing the same relative to the standard.

9. In a vehicle top a standard pivotally connected with a vehicle body, a bow supporting member pivoted to the standard, and means wholly encompassed in said standard and tending constantly to separate said bow member from said standard in all positions of the parts.

10. In a vehicle top, a main standard pivoted to the vehicle body, a rear bow member pivoted thereto to extend rearwardly therefrom, an outrigger bow extending to the front of said standard and pivotally supported solely therefrom, spring means operating upon said rear bow tending to move it in the direction of its pivotal movement by gravity and operating upon said outrigger bow tending to move it in the direction opposite to its pivotal movement by gravity.

11. In a vehicle top, a main standard pivoted to the vehicle body, a rear bow member pivotally mounted to swing in angular relation to said standard and to the rear thereof, an outrigger bow extending to the front of said standard and pivotally supported solely therefrom, spring means operating upon said rear bow member tending to move it in the direction of its pivotal movement by gravity and operating upon said outrigger bow tending to move it in the direction opposite to its pivotal movement by gravity.

12. In a vehicle top, a standard adapted to be pivotally secured to a vehicle body and having a hollow part, a tension spring within said hollow part of said standard, an outrigger bow arm, a link pivotally connected respectively to said outrigger bow arm and said standard and having a free end extended to the rear of its pivot on said standard to a point in substantially the direct line of pull of said spring, and means transmitting the pull of said spring to said link at its said free end whereby said spring is caused to act on said link at its free end to swing said link relative to said standard.

13. In a foldable vehicle top, a standard pivotally connected to a vehicle body; a bow-supporting member pivoted to said standard; and a spring arranged within one of said members and operating longitudinally thereof against the other member, tending to distend said members both in the collapsed and extended conditions of the top.

14. In a foldable vehicle top, the combination of a pivotally-connected standard and rear bow arm, one pivotally mounted on the vehicle body and carrying the other; one of said members being hollow and the other having a lever extension projecting therein into; and a spring in said hollow member acting against said extension for distending the two members.

15. In a foldable vehicle top, the combination of a pivotally-connected spring-distended standard and rear bow arm, one pivotally mounted on the vehicle body and carrying the other; and spring-distended foldable top-extension means carried by said standard; and spring means contained in said standard for distending the parts referred to and maintaining the top elastically distended both forwardly and rearwardly of said standards.

16. In a foldable vehicle top, the combination of a pivotally-connected spring-distended standard and rear bow arm, one pivotally mounted on the vehicle body and carrying the other; and spring-distended foldable top-extension means carried by said standard; and a spring-coupling between said rear bow and top-extension means for distending the parts referred to.

17. In a vehicle top, a standard and bow member pivotally connected; spring-means acting between said members tending to separate them; a front outrigger bow; and links connecting said outrigger bow with said standard, one of said links operatively connected with said first-mentioned bow member, whereby said spring means acts indirectly on said outrigger bow.

In testimony whereof I affix my signature.

MAX BUCH.